United States Patent
Spillane et al.

(10) Patent No.: US 10,776,045 B2
(45) Date of Patent: Sep. 15, 2020

(54) MULTIPLE DATA STORAGE MANAGEMENT WITH REDUCED LATENCY

(71) Applicant: VMware, Inc., Palo Alto, CA (US)

(72) Inventors: Richard P. Spillane, Mountain View, CA (US); Wenguang Wang, Santa Clara, CA (US); Abhishek Gupta, Sunnyvale, CA (US); Maxime Austruy, Lausanne (CH); Christos Karamanolis, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 279 days.

(21) Appl. No.: 15/666,343

(22) Filed: Aug. 1, 2017

(65) Prior Publication Data
US 2019/0004735 A1    Jan. 3, 2019

Related U.S. Application Data

(60) Provisional application No. 62/528,004, filed on Jun. 30, 2017.

(51) Int. Cl.
G06F 3/06 (2006.01)
G06F 12/02 (2006.01)

(52) U.S. Cl.
CPC ............ *G06F 3/0659* (2013.01); *G06F 3/061* (2013.01); *G06F 3/0604* (2013.01); *G06F 3/067* (2013.01); *G06F 3/0643* (2013.01); *G06F 3/0656* (2013.01); *G06F 12/02* (2013.01)

(58) Field of Classification Search
None
See application file for complete search history.

(56) References Cited

U.S. PATENT DOCUMENTS

| | | | |
|---|---|---|---|
| 2004/0107318 A1* | 6/2004 | Bono | G06F 12/0866 711/118 |
| 2008/0183987 A1* | 7/2008 | Ito | G06F 11/004 711/161 |
| 2012/0150799 A1* | 6/2012 | Matsuzawa | G06F 3/0607 707/622 |

(Continued)

OTHER PUBLICATIONS

Baidu Queries Data 30 Times Faster with Alluxio; https://www.alluxio.com/assets/uploads/2016/02/Baidu-Case-Study.pdf.

(Continued)

*Primary Examiner* — Eric Cardwell
(74) *Attorney, Agent, or Firm* — Loza

(57) ABSTRACT

System and method for managing multiple data storages using a file system of a computer system utilize a primary data storage to cache objects of logical object containers stored in a secondary data storage in caching-tier volumes. When an access request for an object stored in the secondary data storage is received at the file system and the object is not currently cached in the primary data storage, a caching-tier volume in the primary data storage is created that corresponds to a logical object container in the secondary data storage that includes the requested object. The caching-tier volume is used to cache the object as an inflated file so that the inflated file is available at the primary data storage in the caching-tier volume for a subsequent access request for the object stored in the secondary data storage.

14 Claims, 18 Drawing Sheets

(56) References Cited

U.S. PATENT DOCUMENTS

| | | | | |
|---|---|---|---|---|
| 2013/0041872 A1* | 2/2013 | Aizman | ............... | G06F 16/182 707/690 |
| 2014/0136803 A1* | 5/2014 | Qin | ........................ | G06F 3/065 711/162 |

OTHER PUBLICATIONS

Carbon 3d; https://www.carbon3d.com, accessed Sep. 19, 2017.
Carbon 3d: https://www.youtube.com/watch?v=qD1yJDVNkPO, accessed Sep. 19, 2017.
Cloudarray; https://www.emc.com/storage/cloudarray/index.htm#!resources, accessed Sep. 19, 2017.
Compuverde Technical Overview, version 1.12, May 3, 2017; http://compuverde.com/media/138857/compuverde-technical-overview.pdf.
Internet of things, last edited on Jul. 10, 2017; https://en.wikipedia.org/wiki/Internet_of_things.
Tachyon: Reliable, Memory Speed Storage for Cluster Computing Frameworks; https://people.csail.mit.edu/matei/papers/2014/socc_tachyon.pdf; SoCC '14; 2014.
What's changing in big data, Jun. 21, 2016; https://www.usenix.org/conference/hotcloud16/workshop-program/presentation/keynote-address.
Amvrosiadis, George et al.; "Opportunistic Storage Maintenance"; In proceedings of the 25th Symposium on Operating Systems Principles; SOSP '15, pp. 457-473; New York, NY; 2015 ACM.
Bonwick, Jeff et al.; ZFS The last word in file systems; 2007.
Chen, Yanpei et al.; "Interactive Analytical Processing in Big Data Systems: A Cross-Industry Study of MapReduce Workloads"; Proceedings of VLBD Endowment, 5(12): 1802-1813; 2012.
Deslauriers, Francis et al.; "Quartet: Harmonizing task scheduling and caching for cluster computing"; In 8th USENIX Workshop on Hot Topics in Storage and File sytems (HotStorage 16), Denver, CO; 2016.
Gray, Jim et al.; "Quickly Generating Billion-Record Synthetic Databases"; Association for Computing Machinery, Inc.; Jan. 1994.
Harter, Tyler et al.; "Analysis of HDFS Under HNase: A Facebook Messages Case Study"; In FAST, vol. 14, p. 12; 2014.
Jose, Justin et al.; "Solid compression strategy for BTRFS snapshot"; In Recent Advances in Electronics & Computer Engineering (RAECE), 2015 National Conference, pp. 160-164; IEEE 2015.
Lu, Luke et al.; "VDFS: A Cloud-Centric Virtual Distributed File System"; In proceedings of VMware Radio 2015, May 2015.
Ousterhout, Kay et al.; "Making Sense of Performance in Data Analytics Frameworks"; In proceedings of 12th USENIX Symposium on Networked Systems Design and Implementation; NSDI '15; pp. 294-307; USENIX Association, 2015.
Spillane, Richard P. et al.; "Exo-clones: Better Container Runtime Image Management Across the Clouds"; In proceedings of VMware Radio 2016, May 2016.
Zhang, Ben et al.; "The Cloud is Not Enough: Saving IoT from the Cloud"; In 7th USENIX Workshop on Hot Topics in Cloud Computing (HotCloud 15); Santa Clara, CA; 2015.

* cited by examiner

MULTIPLE DATA STORAGE MANAGEMENT WITH REDUCED LATENCY

CROSS REFERENCE TO RELATED APPLICATION

This application is entitled to the benefit of U.S. Provisional Patent Application Ser. No. 62/528,004, filed on Jun. 30, 2017, which is incorporated herein by reference.

BACKGROUND

Public object storage, such as Amazon Web Services (AWS) Simple Storage Service (S3) and Google Cloud Storage, is an inexpensive and popular way to store large amount of data. Thus, the trend in the IT industry is to move the bulk of analytics and application data to such object storages, which are provided by third parties as services. At the same time, users of these object storage services typically want to continue accessing and analyzing much of that data using applications that run on compute clusters that may reside on either public clouds or on-premise computing environments.

However, accessing data from the public object storages can be very expensive. Many enterprise customers already have on-premise data centers, which have large amounts of idle computing power. However, the process to copy data from a public object storage to on-premise data centers for processing is slow and expensive because network bandwidth is expensive and network latency is high. Another common problem of accessing object data is the interface. AWS S3 provides a REST API via HTTPS, but many existing applications are built on top of Portable Operating System Interface (POSIX) file system interface.

BRIEF DESCRIPTION OF THE DRAWINGS

Throughout the description, similar reference numbers may be used to identify similar elements.

DETAILED DESCRIPTION

Figure 1:
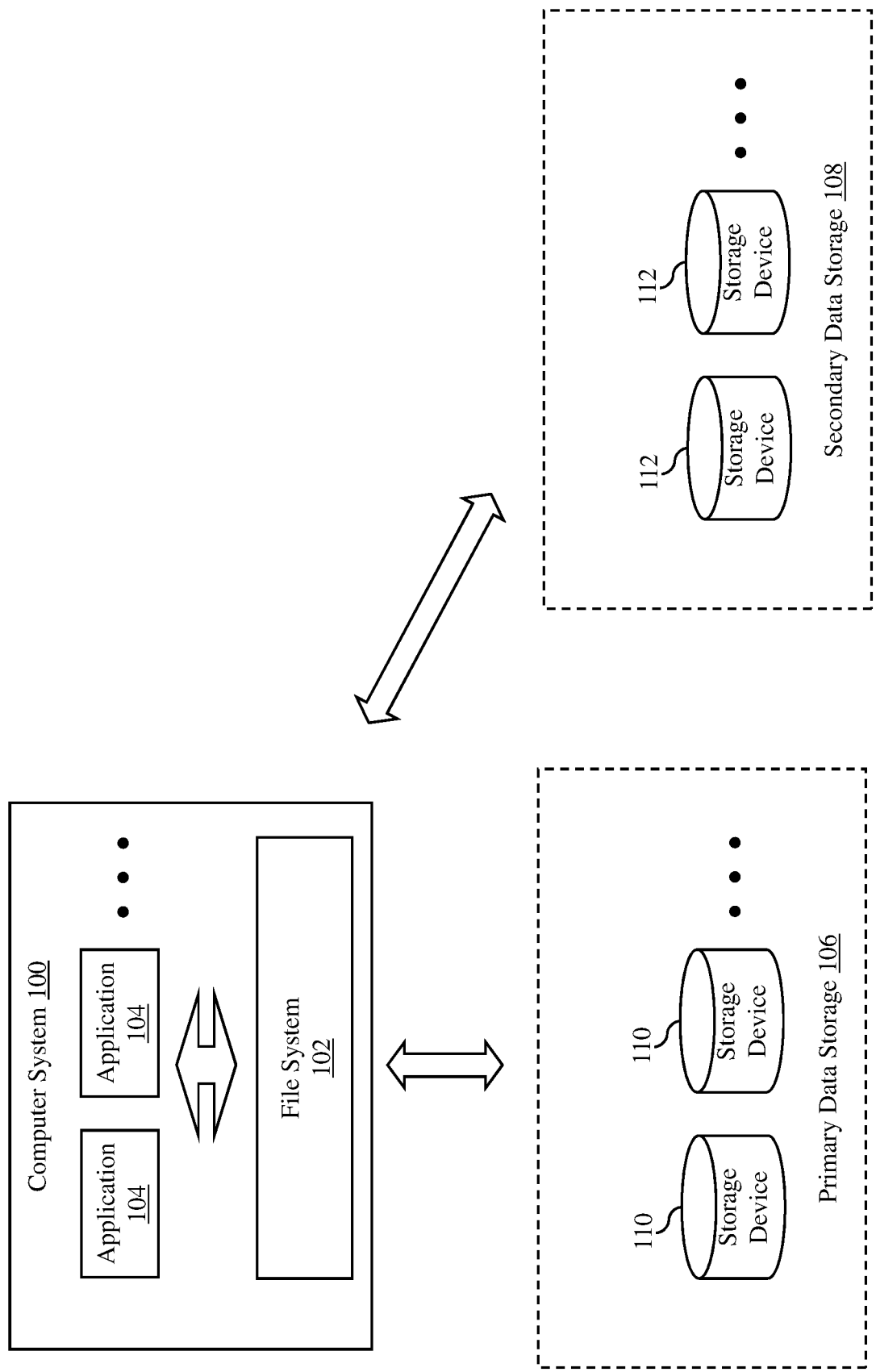
FIG. 1 is a block diagram of a computer system with a file system in accordance with an embodiment of the invention.

FIG. 1 depicts a computer system 100 in accordance with an embodiment of the invention. The computer system is shown to include a file system 102. Other components of the computer system that are commonly found in a conventional computer system, such as memory and one or more processors, are not shown in FIG. 1. The file system 102 allows applications 104 running on the computer system to perform file system operations, such as writing, reading and/or accessing data related to file system objects, e.g. directories, folders or files. The data related to file system objects or file system object data may include metadata information about the file system objects and actual data of file system objects. The file system object data may be stored in different data storages, which are accessible by the computer system. As illustrated in FIG. 1, the computer system may be able to access a primary data storage 106 and a secondary data storage 108. In an embodiment, the primary data storage is faster to access than the secondary data storage but more costly than the secondary data storage. Thus, the secondary data storage may be used to store a large amount of file system object data. However, due to latency of the secondary data storage, the file system object data stored in the secondary data storage may not efficiently be accessed and used by the applications running on the computer system. As described below, the file system provides a mechanism to more efficiently access the file system object data stored in the secondary data storage so that applications may effectively access and use the file system object data stored in the secondary data storage.

The applications 104 can be any software program that can run on the computer system 100, which can be a physical computer, a virtual computer, such as a VMware virtual machine, or a distributed computer system. The applications may perform various file system operations, such as read, write, delete, and rename operations for file system objects stored in the primary data storage 106 and the secondary data storage 108.

The primary data storage 106 includes one or more computer data storage devices 110, which may be used by the computer system 100 to store data, including metadata of file system objects and actual data of the file system objects. The data storage devices can be any type of non-volatile storage devices that are commonly used for data storage. As an example, the data storage devices may be, but not limited to, solid-state devices (SSDs), hard disks or a combination of the two. The storage space provide by the data storage devices may be divided into storage units, which may be disk blocks, disk sectors, storage device sectors or logical storage spaces, e.g., datastores or volumes.

In an embodiment, the primary data storage 106 may be a local storage system of the computer system 100, such as hard drive disks in a personal computer system or an on-premise storage system that is part of a data center. In another embodiment, the primary data storage may be a remote storage system that can be accessed via a network, such as a network-attached storage (NAS). In still another embodiment, the storage system may be a distributed storage system such as a storage area network (SAN) or a virtual SAN. Depending on the embodiment, the primary data storage may include other components commonly found in those types of storage systems, such as network adapters, storage drivers and/or storage management servers. The primary data storage may be scalable, and thus, the number of data storage devices 110 included in the primary data storage can be changed as needed to increase or decrease the capacity of the primary data storage to support increase/decrease in workload. Consequently, the exact number of data storage devices included in the primary data storage can vary from one to hundreds or more.

Similar to the primary data storage 106, the secondary data storage 108 includes one or more computer data storage devices 112, which may be used by computer systems, such as the computer system 100, to store data, including metadata of file system objects and actual data of the file system objects. The data storage devices 112 can be any type of non-volatile storage devices that are commonly used for bulk data storage. Similar to the data storage devices 110, the data storage devices 112 may be, but not limited to, SSDs, hard disks or a combination of the two. However, in a particular implementation, the data storage devices 112 are hard disks, which are inexpensive compared to SSDs. The storage space provide by the data storage devices may be divided into storage units, which may be disk blocks, disk sectors, storage device sectors or logical storage spaces.

In an embodiment, the secondary data storage 108 may be storage provided by on-premise deployed products that are often accessible through a networked file system interface. Examples of these on-premise bulk storage include NFS filers, Data Domain appliances, or dedicated HDFS clusters. In another embodiment, the secondary data storage may be a public cloud object storage provided as a service. Examples of public cloud object storage providers include AWS S3 and Google Cloud Storage. Depending on the embodiment, the secondary data storage may include other components commonly found in those types of storage systems, such as network adapters, storage drivers and/or storage management servers. In either embodiment, the secondary data storage is decoupled from computer systems, such as the computer system 100, where data is generated and/or processed. In both embodiments, the secondary data storage exhibits high access latencies, and thus, is typically not appropriate for direct access by applications, such as the applications 104 running on the computer system 100.

In an embodiment, the secondary data storage may be an object storage, and thus, is configured to store data as object stores. As such, files are stored in the secondary data storage object in a flat organization of logical object containers, which are called "buckets" in Amazon S3, using unique identifications (IDs) or object names, which are called "keys" in Amazon S3.

The file system 102 operates to present storage resources of the primary and secondary data storages 106 and 108 as one or more file system structures, which may include hierarchies of file system objects, such as file system volumes, file directories/folders, and files, for shared use of the storages. Thus, the file system organizes the storage resources of the storages into the file system structures so that the applications can access the file system objects for various file system operations, such as creating file system objects, deleting file system objects, writing or storing file system objects, reading or retrieving file system objects and renaming file system objects.

For data stored in the secondary data storage 108, the file system 102 utilizes the entire primary data storage 106 as a caching tier so that data stored in the secondary data storage can be quickly accessed and used by one or more of the applications 104 running on the computer system 100. In an embodiment, the file system creates caching logical storage units called caching-tier volumes, which resemble regular file system volumes. However, these caching-tier volumes fault-in data from the secondary data storage on first access. The cached data are persisted on the faster primary data storage so that applications can access the data stored on the secondary data storage without significant latencies and without any changes to the applications.

In some embodiments, the file system 102 generates cache-related properties of files in the caching-tier volumes in the primary data storage 106, which are exposed to the applications 104 through an interface. In an embodiment, the file system generates the cache-related properties of files in the caching-tier volumes as extended attributes, which can be accessed by the applications via POSIX extended attributes interface, such as listxattr, getxattr, etc. Thus, in this embodiment, the file system is a POSIX compliant file system. As an example, the file system may generate a cache state extended attribute, which indicates the current cache state of a file in a caching-tier volume. The current cache state of a caching-tier volume file may be an inflated state, which indicates the data of the file has been transferred to the caching-tier volume from the secondary data storage 108, or a stubbed state, which indicates that the data of the file has not been transferred to the caching-tier volume from the secondary data storage, and thus, the file is empty. Thus, the current cache state of a file indicates whether the file is an inflated file or an empty stub file. As another example, the file system may generate a skip write-back extended attribute, which is used to mark files that should be skipped for write-back. In a particular implementation, this attribute is used to mark files that should be skipped when constructing an exo-clone for write-back. Exo-clones will be described later in the context of write-back feature of the file system. As another example, the file system may generate a cache pinned extended attribute, which is used to mark files that should not be evicted from caching-tier volumes in the primary data storage. The use of extended attributes to expose caching functionalities at the file system layer facilitates the ability to add new features that can be made broadly available to all applications without having to update a plethora of application programming interfaces (APIs).

These cache-related properties of files can be used by applications to implement a variety of application-specific caching policies or optimizations. For example, by exposing the current cached state of files to the application layer, a job scheduler such as YARN or Mesos, when faced with a decision as to which job to run next, could choose to schedule the job that has the highest amount of file data already cached on the primary data storage in one or more caching-tier volumes. As another example, Spark application stores intermediate computational state in large sets called resilient distributed datasets (RDDs). These RDDs can be recomputed based on linage, but this can be time-consuming, so Spark application allows uses to persist RDDs to RAM, DISK or a replicated DISK. Spark application can be easily modified to mark files that RDDs are persisted using the skip write-back extended attribute or the cache pinned extended attribute. This would prevent the intermediate files, which are intended only as computation checkpoints, from being transmitted over the wide area network (WAN) to a public cloud needlessly either due to eviction or write-back.

The file system 102 is designed to enable applications to have fine-control over when updates to cached files are written back to the secondary data storage 108. The file system allows an application to create a snapshot of a caching-tier volume created in the primary data storage 106, and then allows the application to freely write to the caching-tier volume. The file system allocates space for the caching-tier volume the same as it would for any other volume, so the application can manage the space of the caching-tier volume as it would for any other storage volume. The file system allows the application to create a second snapshot of the caching-tier volume when the application wants to write back the caching-tier volume, and to construct snapshot difference data, which includes information of differences between the first original snapshot of the caching-tier volume and the second snapshot of the caching-tier volume. In a particular implementation, the snapshot difference data is an exo-clone, which can exist as a regular file that can be transferred between difference storage systems. Exo-clones are described in "*Exo-clones: Better Container Runtime Image Management across the Clouds*" by Spillane et al., which is incorporated herein by reference. In an embodiment, the file system is configured to create snapshots of caching-tier volumes and create snapshot difference data in response to instructions from applications running on the computer system.

The snapshot difference data can then be uploaded to a remote data repository program, which can apply the snapshot difference data to the secondary data storage 108 to update the stored data corresponding to the cached data in the caching-tier volume. In an embodiment, the remote data repository program may be running in a virtual machine within the same computing environment as the secondary data storage, such as a public cloud that supports the secondary data storage. As used herein, a virtual machine is a virtualized computer system running on a physical host computer system that uses physical resources of the host computer system as virtualized resources, such as virtualized processor and virtualized memory. As an example, the virtual machine may be a VMware virtual machine.

The use of snapshot difference data allows application to continue making updates and writing on the primary data storage 106, even in the face of potential disconnection from the secondary data storage 108, which may be a public cloud storage. In addition, interruptions of write-back are easily resolved by simply resending the snapshot difference data, e.g., the exo-clone. Since the entire primary data storage is available as the caching tier, there is ample capacity to absorb writes while intermittent failures are resolved, without necessitating downtime for the application and the customer.

Figure 2:
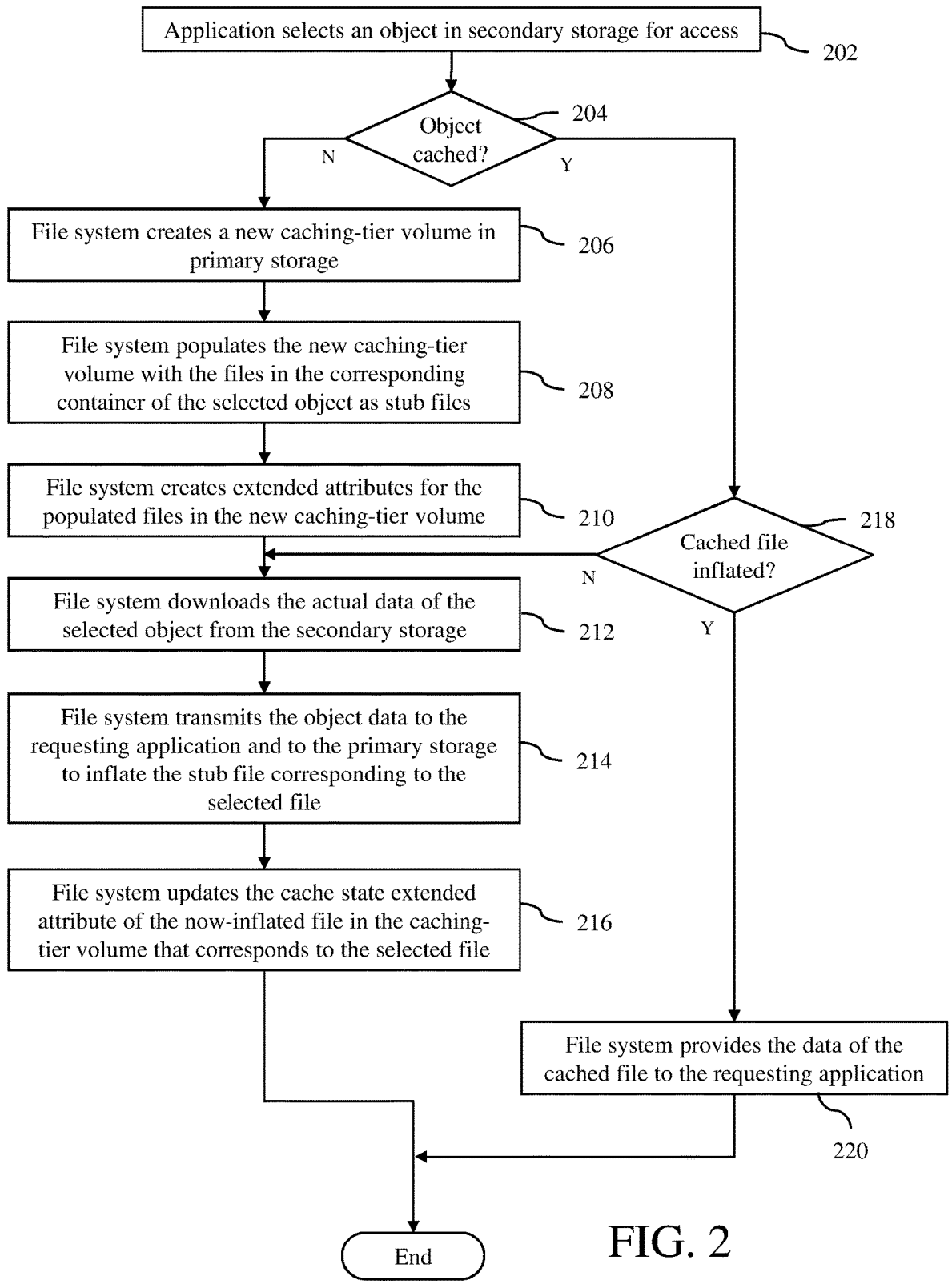
FIG. 2 is a process flow diagram of an object access operation for objects stored in a secondary data storage using the file system in accordance with an embodiment of the invention.
Figure 3A:
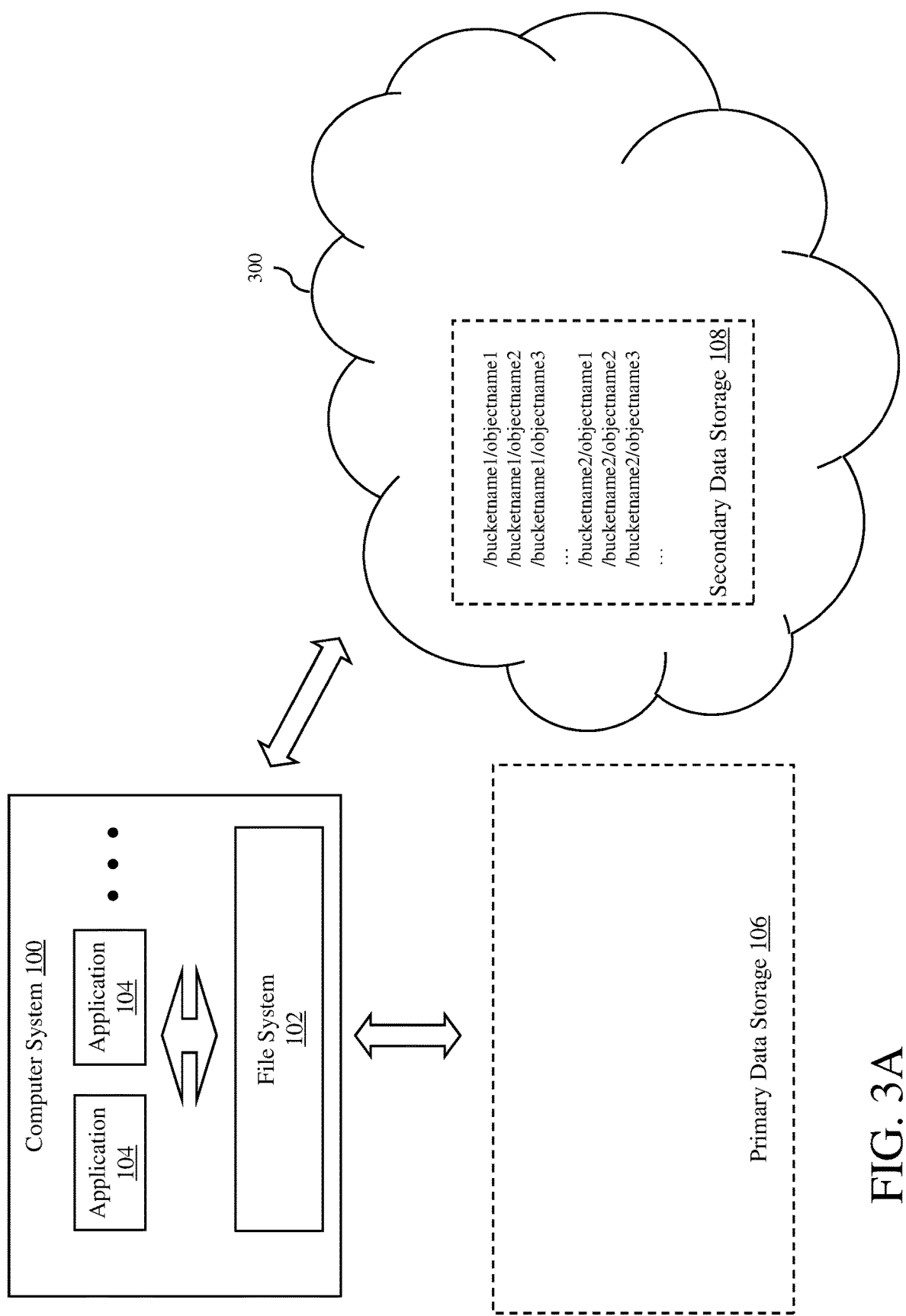
FIGS. 3A-3E illustrate the object access operation, where the secondary data storage is a public cloud object storage, in accordance with an embodiment of the invention.

An object access operation for objects stored in the secondary data storage 108 using the file system 102 in accordance with an embodiment of the invention will now be described with references to the flow diagram of FIG. 2 using an example in which the secondary data storage is a public cloud object storage, such as Amazon S3, as illustrated in FIG. 3A. Thus, the secondary data storage is depicted in FIG. 3A as being in a public cloud 300. In FIG. 3A, the storage devices of the primary and secondary data storages 106 and 108 are not illustrated. As shown in FIG. 3A, the secondary data storage includes a number of files, which are each indexed using a logical object container name and an object name. In this example, the secondary data storage includes objects (which can be any stored data, such as files) from two containers or buckets, bucketname1 and bucketname2. Thus, the objects stored in the secondary data storage includes objects with file paths that have the format: /bucketname1/objectname# or /bucketname2/objectname#.

Figure 3B:
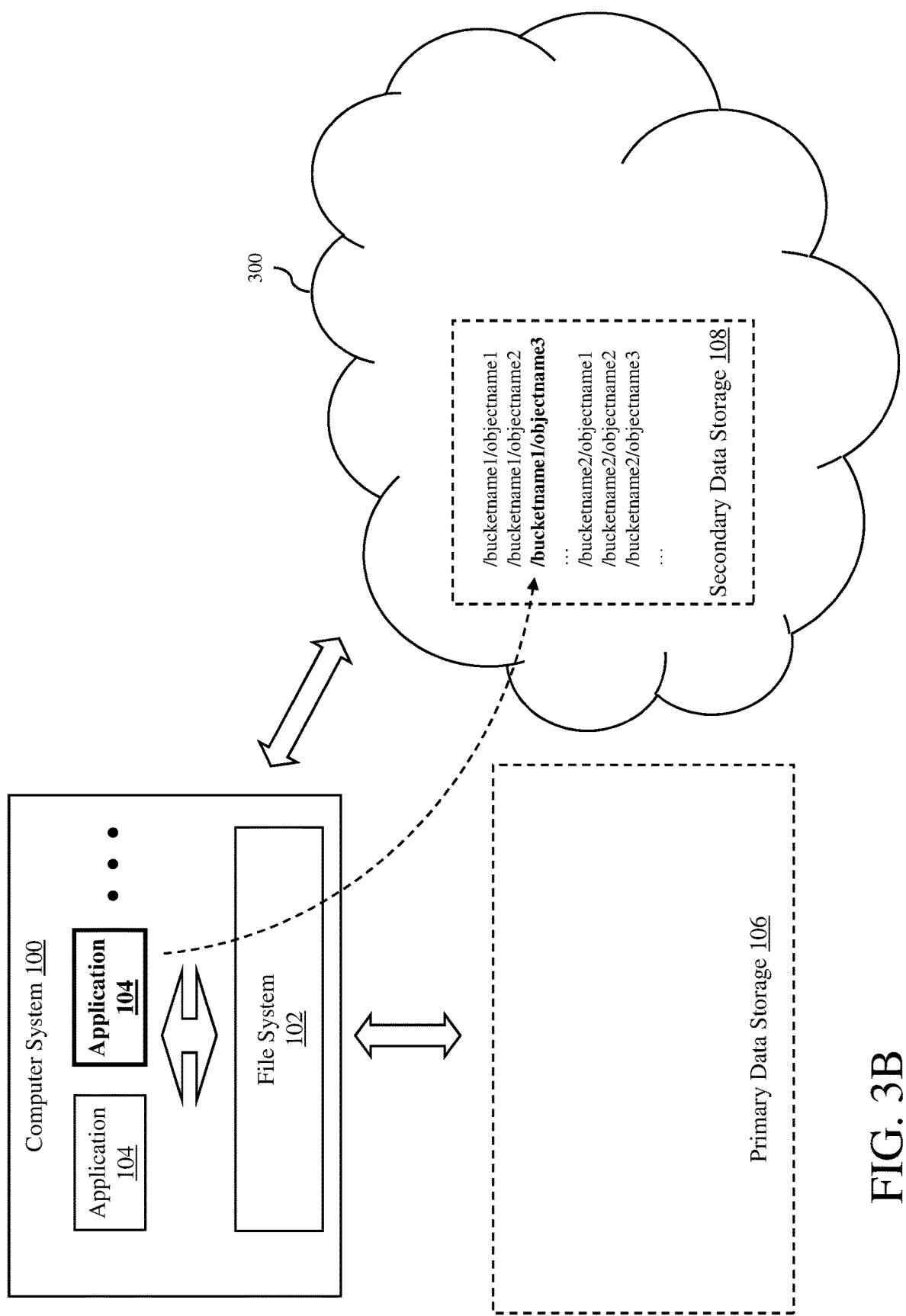

As shown in the flow diagram of FIG. 2, the object accessing operation begins at block 202, where an application, which may be running on the computer system 100, selects an object in the secondary data storage 108 for access. This step is illustrated in FIG. 3B, where the highlighted application 104 running on the computer system 100 selects the object with the file path /bucketname1/objectname3 for access.

Next, at block 204, the file system 102 determines whether the selected object is currently cached in a caching-tier volume stored in the primary data storage 106. If the selected object is currently cached, this means that the selected object or another object in the logical object container of the selected object has been previously accessed. If the selected object is not currently cached, this means that no file in the logical object container of the selected file has been accessed recently.

Figure 3C:
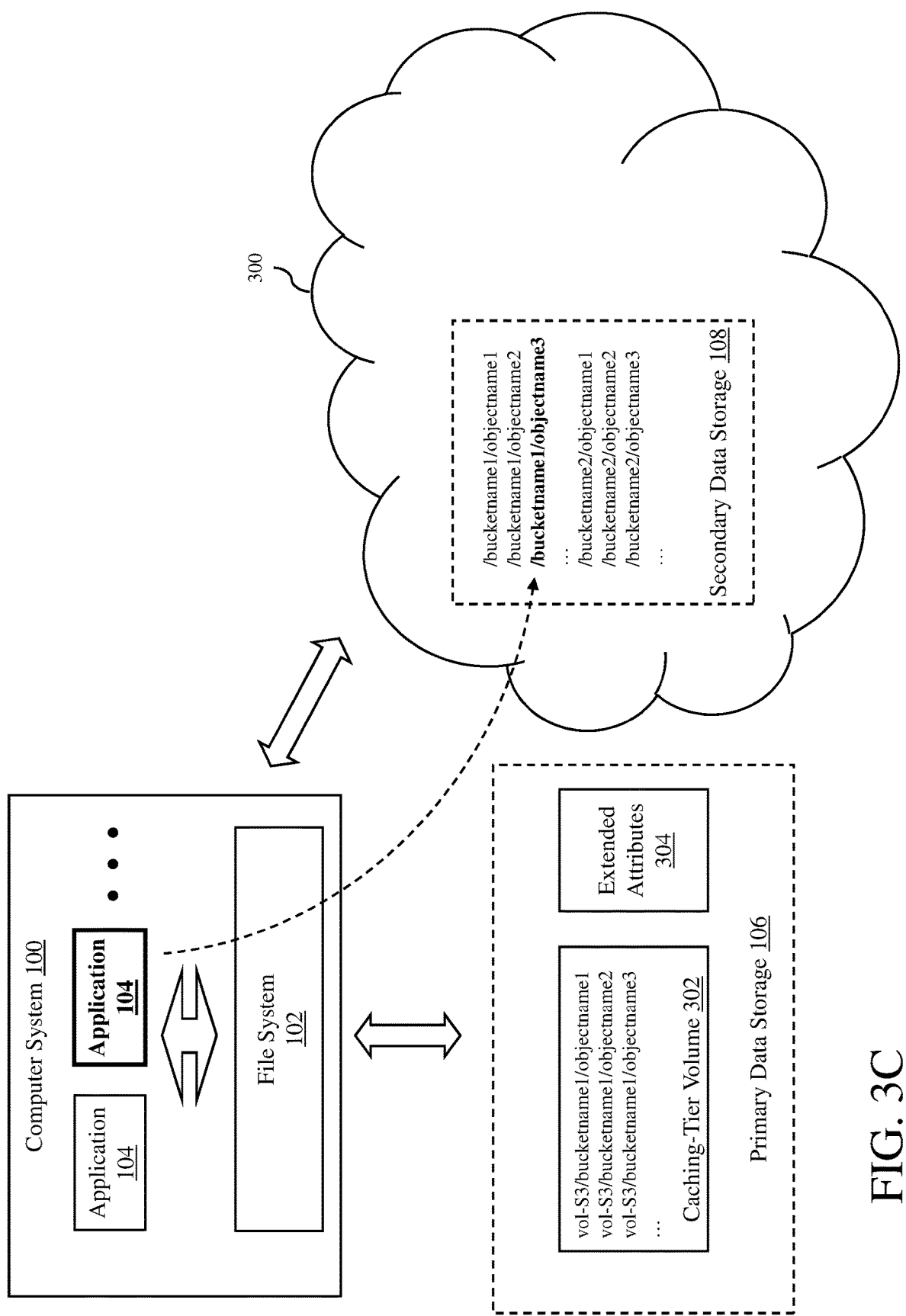

If it is determined that the selected object is not currently cached, the file system 102 creates a new caching-tier volume in the primary data storage 106 for the logical object container to which the selected object belongs, at block 206. Next, at block 208, the file system populates the new caching-tier volume with all the objects in the corresponding container as stub files in the primary data storage. Next, at block 210, the file system creates extended attributes for the populated files in the new caching-tier volume. These three steps are illustrated in FIG. 3C, where a new caching-tier volume 302 is created in the primary data storage for the container bucketname1 and populated with files that represent the objects in the bucketname1 as stub files in the primary data storage, and extended attributes 304 are created for the populated files.

Figure 3D:
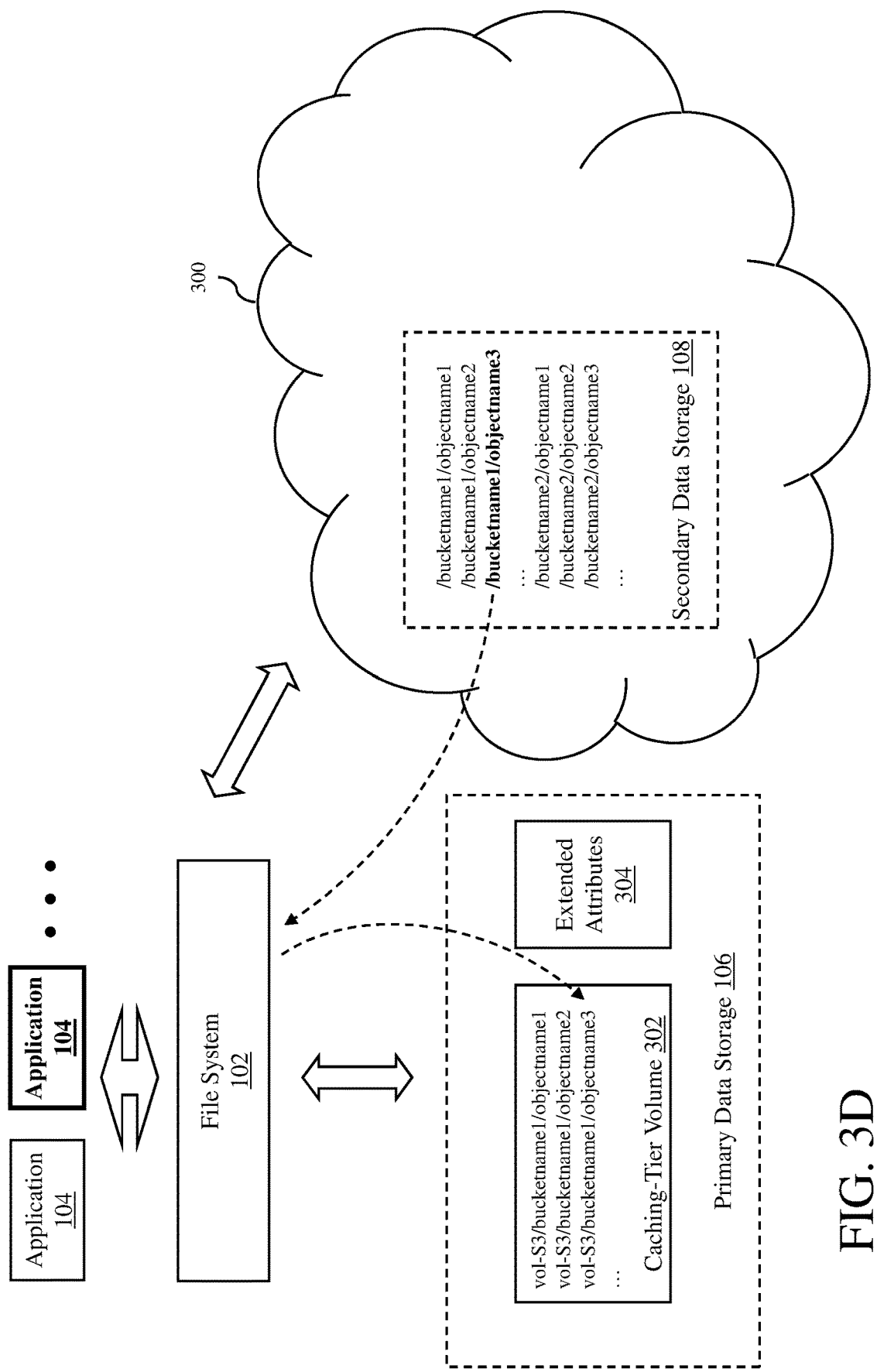

Next, at block 212, the file system 102 downloads the actual data of the selected object from the secondary data storage 108. Next, at block 214, the file system transmits the object data to the primary data storage 106 to inflate the stub file corresponding to the selected object in the new caching-tier volume in the primary data storage. Next, at block 216, the file system updates the cache state extended attribute of the now-inflated file in the caching-tier volume that corresponds to the selected object. These three steps are illustrated in FIG. 3D, where the data of the selected object with the file path /bucketname1/objectname3 is downloaded from the secondary data storage and transmitted to the requesting application 104 and to the primary data storage to inflate the stub file corresponding to the selected object in the new caching-tier volume in the primary data storage. In addition, the cache state extended attribute 304 of the now-inflated file is updated to reflect that the file is inflated.

Figure 3E:
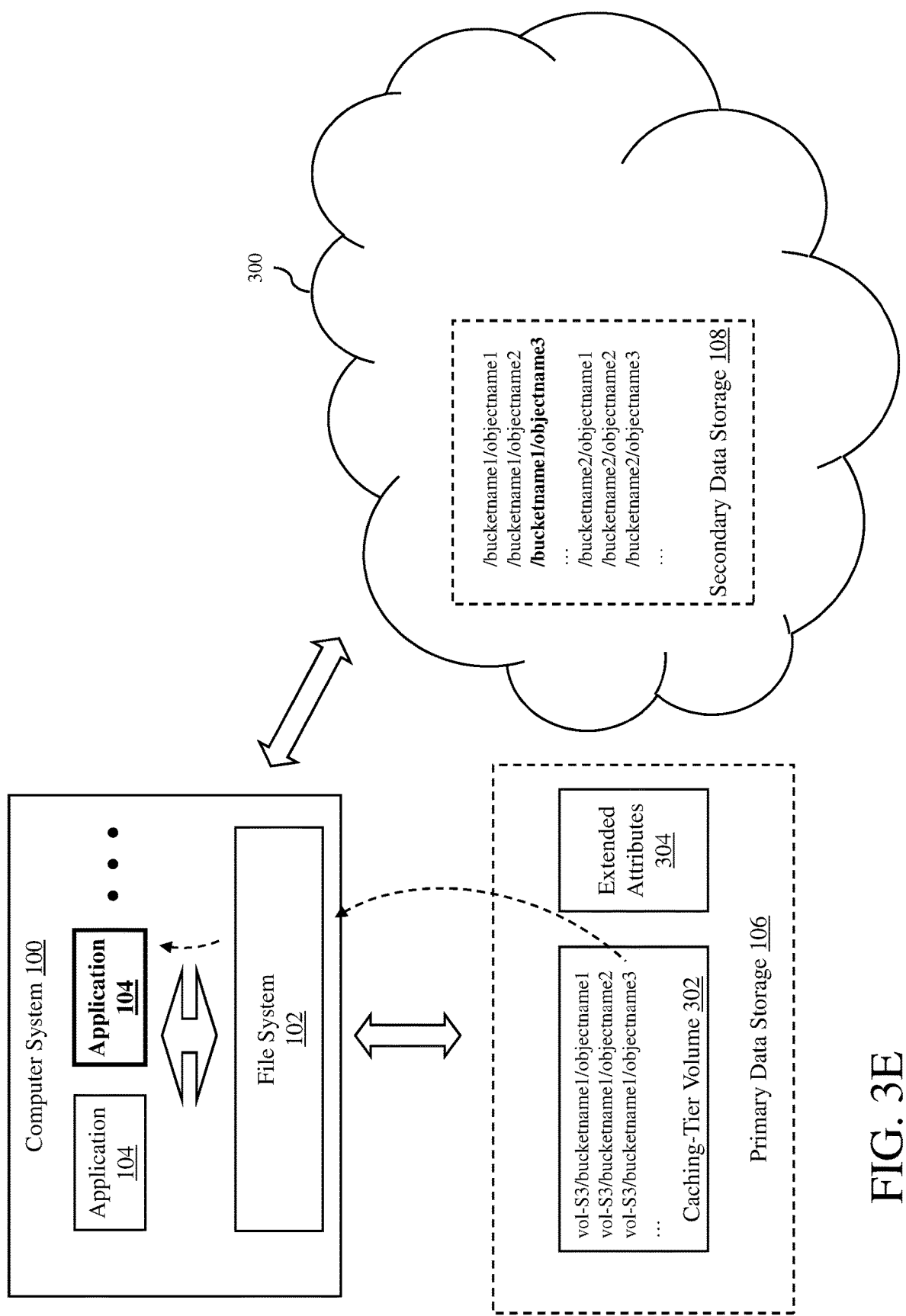

If it is determined that the selected object is currently cached in a caching-tier volume in the primary data storage 106, the file system 102 determines whether the cached file corresponding to the selected file is inflated, at block 218. If the cached file is inflated, the operation proceeds to block 220, the file system 102 provides the data of the cached file corresponding to the object to the requesting application. This step is illustrated in FIG. 3E, where the data of the cached file (inflated) with the file path vol-S3/bucketname1/objectname3 is provided to the requesting application.

However, if the cached file is not inflated, the operation proceeds to block 212, so that the actual data of the selected object can be downloaded from the secondary data storage 108 such that the downloaded object data can be used to inflate the corresponding cached file in the caching-tier volume in the primary data storage 106 and provided to the requesting application.

In an alternative embodiment, the caching-tier volume may be created in the mount phase before any input/output (IO). So, in this alternative embodiment, once the caching-tier volume is created, a readdir file system request (usually triggered by shell command 1s) will trigger the caching-tier volume to populate the volume with directories mapping the backend object bucket names. When the readdir request (usually triggered by "1s" command) is sent to a directory mapped to a bucket, the backend object store is contacted to stuff the directory with list of stub files mapping each object within the bucket. When the lookup request (usually triggered by "stat" or "open" POSIX API) is sent to the directory, a stub file mapping to the requested object name under that bucket is created. When a file read request (usually triggered by "read" or "pread" POSIX API) is sent to a file, the file is inflated by filling backend data into it.

The use of the cached files stored in the primary data storage 106 allows applications to more quickly access objects stored in the secondary data storage 108 since the objects that are accessed frequently do not have to be repeatedly downloaded from the secondary data storage, which would introduce significant access latencies.

Figure 4:
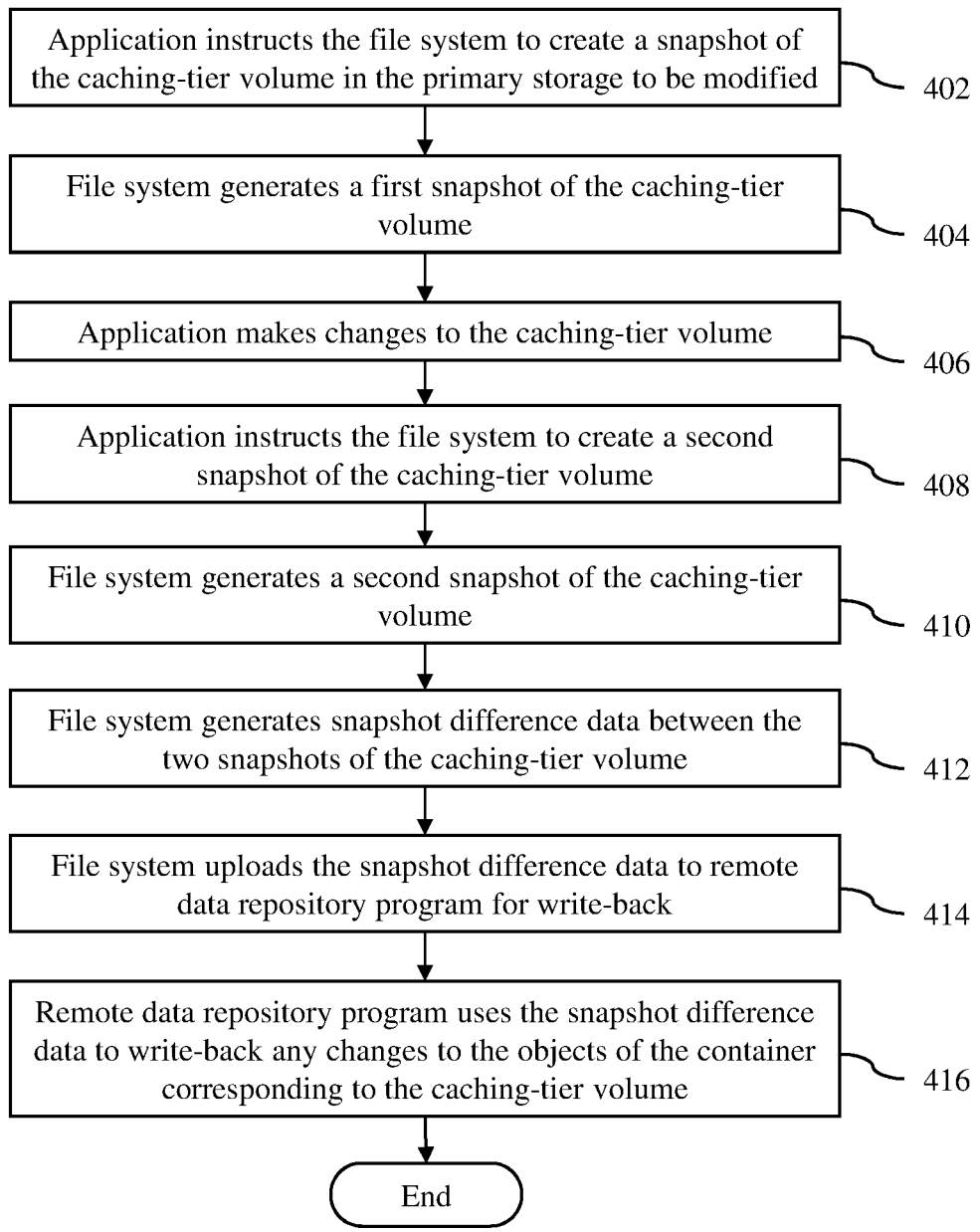
FIG. 4 is a process flow diagram of a write-back operation for a caching-tier volume stored in the primary data storage using the file system in accordance with an embodiment of the invention.
Figure 5A:
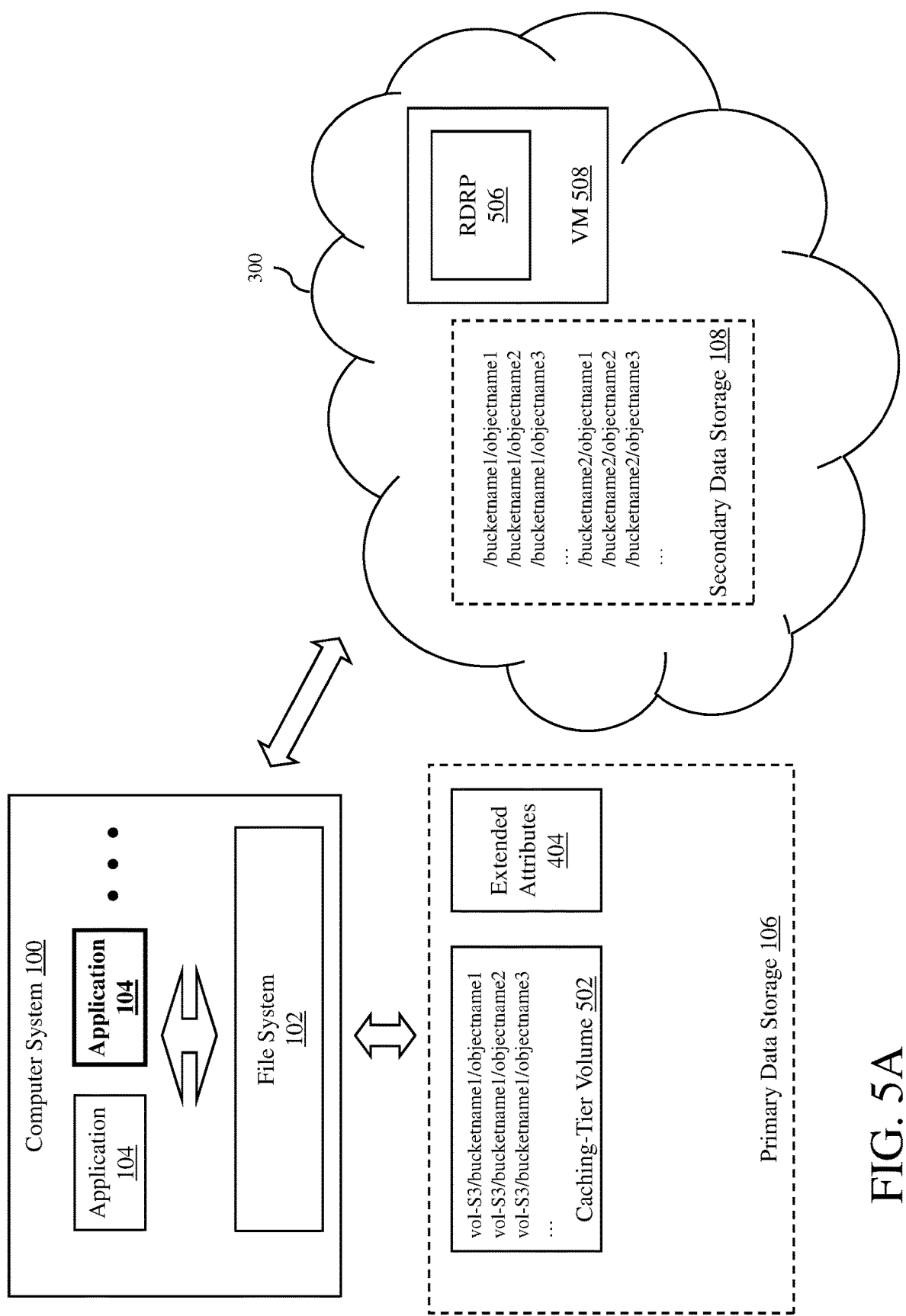
FIGS. 5A-5G illustrate the write-back operation, where the secondary data storage is a public cloud object storage, in accordance with an embodiment of the invention.

A write-back operation for a caching-tier volume stored in the primary data storage 106 using the file system 102 in accordance with an embodiment of the invention will now be described with references to the flow diagram of FIG. 4 using an example in which the secondary data storage is a public cloud object storage, such as Amazon S3, as illustrated in FIG. 5A. As shown in FIG. 5A, the primary data storage includes a caching-tier volume 502 that corresponds to the logical object container bucketname1 in the secondary data storage 108 and extended attributes 504 of files in the caching-tier volume. Also, shown in FIG. 5A is a remote data repository program (RDRP) 506 running on a virtual machine 508 in the public cloud 300. In this example, let's assume that the highlighted application 104 wants to make changes to the cached files in the caching-tier volume 502.

Figure 5B:
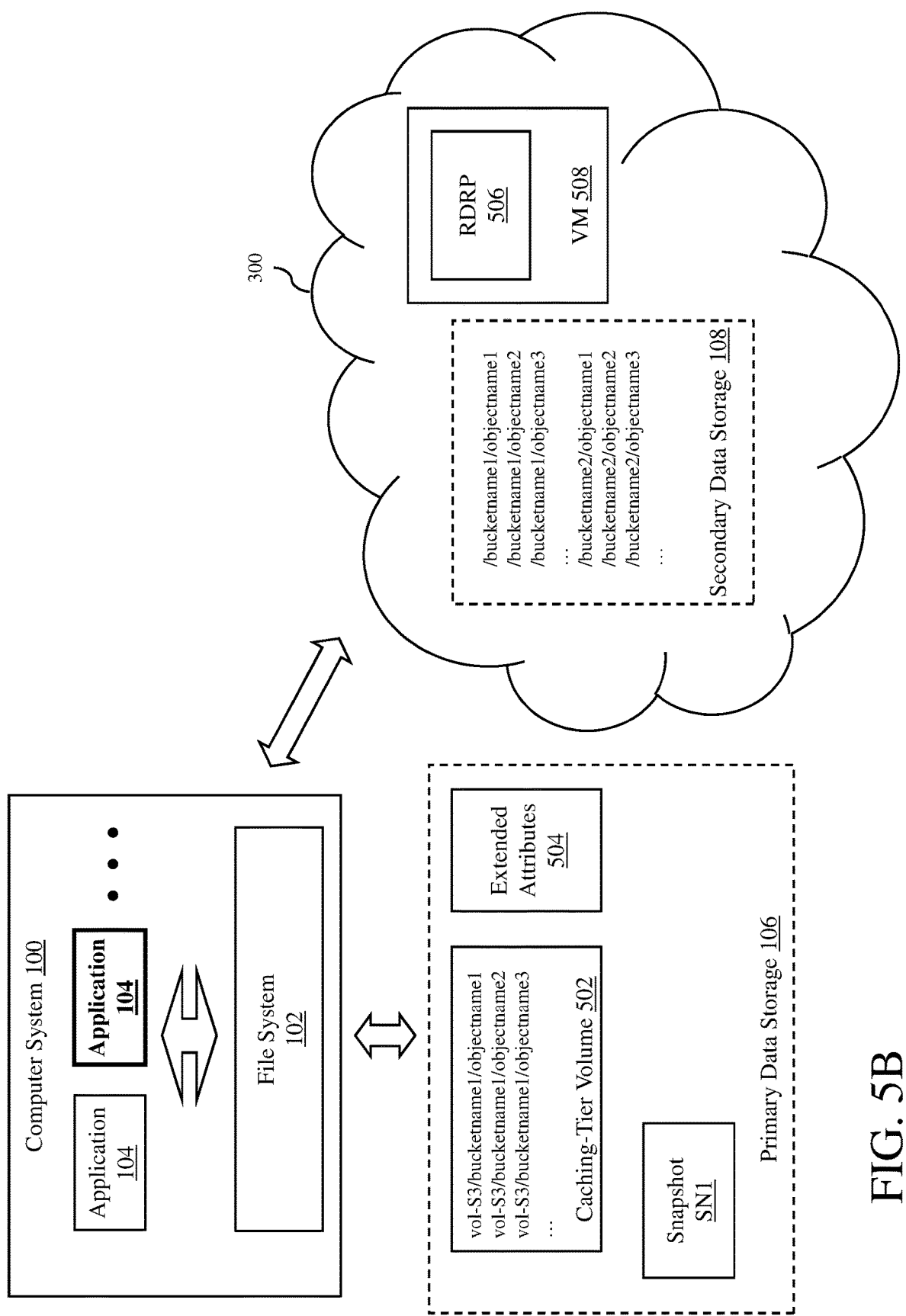

As shown in the flow diagram of FIG. 4, the write-back operation begins at block 402, where an application instructs the file system 102 to create a snapshot of the caching-tier volume in the primary data storage to be modified. Next, at block 404, in response to the request for creation of a snapshot, the file system generates a first snapshot of the caching-tier volume, which is stored in the primary data storage 106. This step is illustrated in FIG. 5B, where the file system creates a first snapshot SN1 of the caching-tier volume 502 in the primary data storage.

Figure 5C:
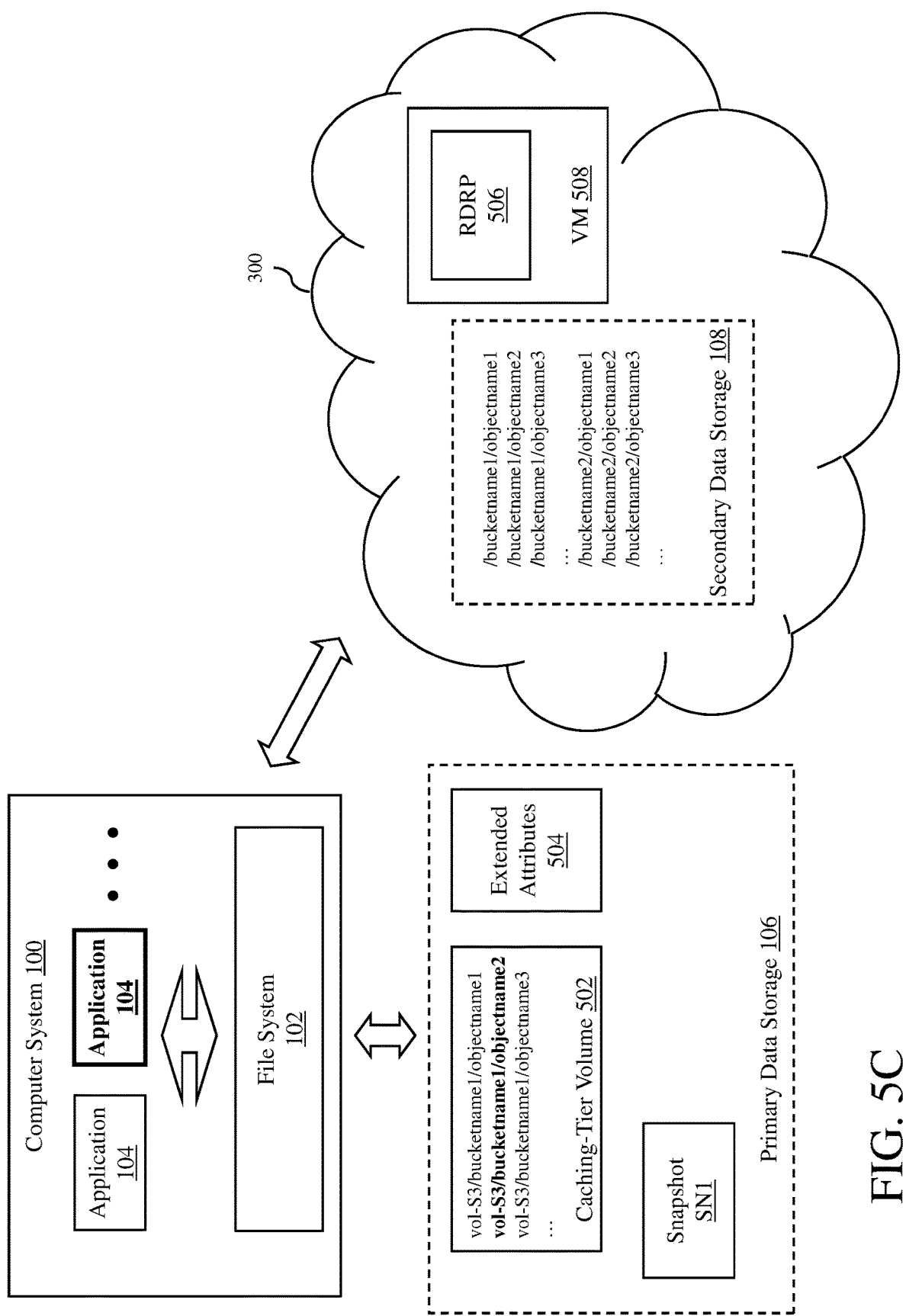

Next, at block 406, the application makes changes to the caching-tier volume by, for example, changing some of the cached files in the caching-tier volume. This step is illustrated in FIG. 5C, where the caching-tier volume 502 has been changed. In particular, the cached file with the file path vol-S3/bucketname1/objectname2 of the caching-tier volume 502 has been modified.

Figure 5D:
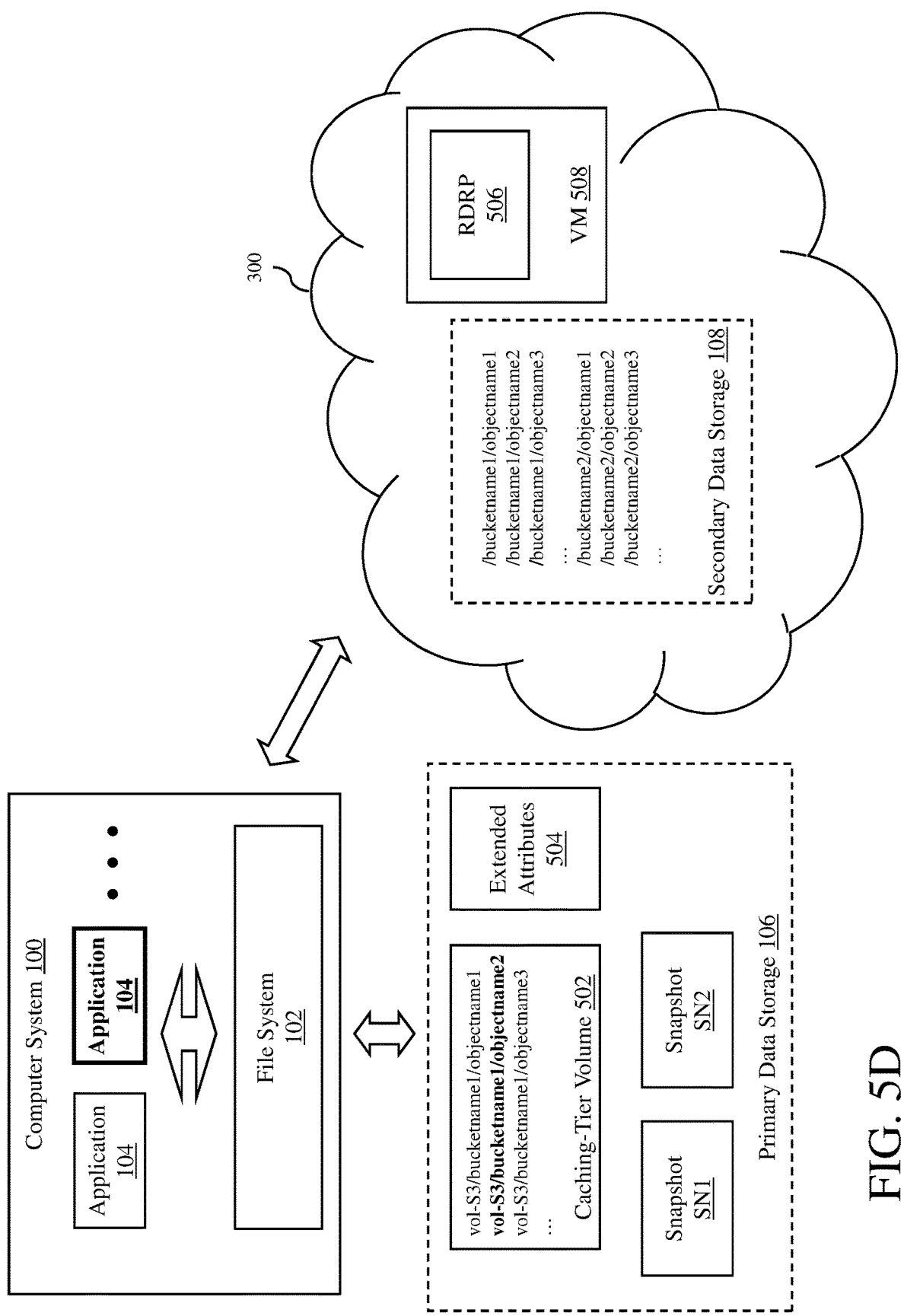

Next, at block 408, the application instructs the file system 102 to create a second snapshot of the caching-tier volume. Next, at block 410, in response to the request for creation of a second snapshot, the file system generates a second snapshot of the caching-tier volume, which is also stored in the primary data storage 106. This step is illustrated in FIG. 5D, where the file system creates a second snapshot SN2 of the caching-tier volume 502 in the primary data storage.

Figure 5E:
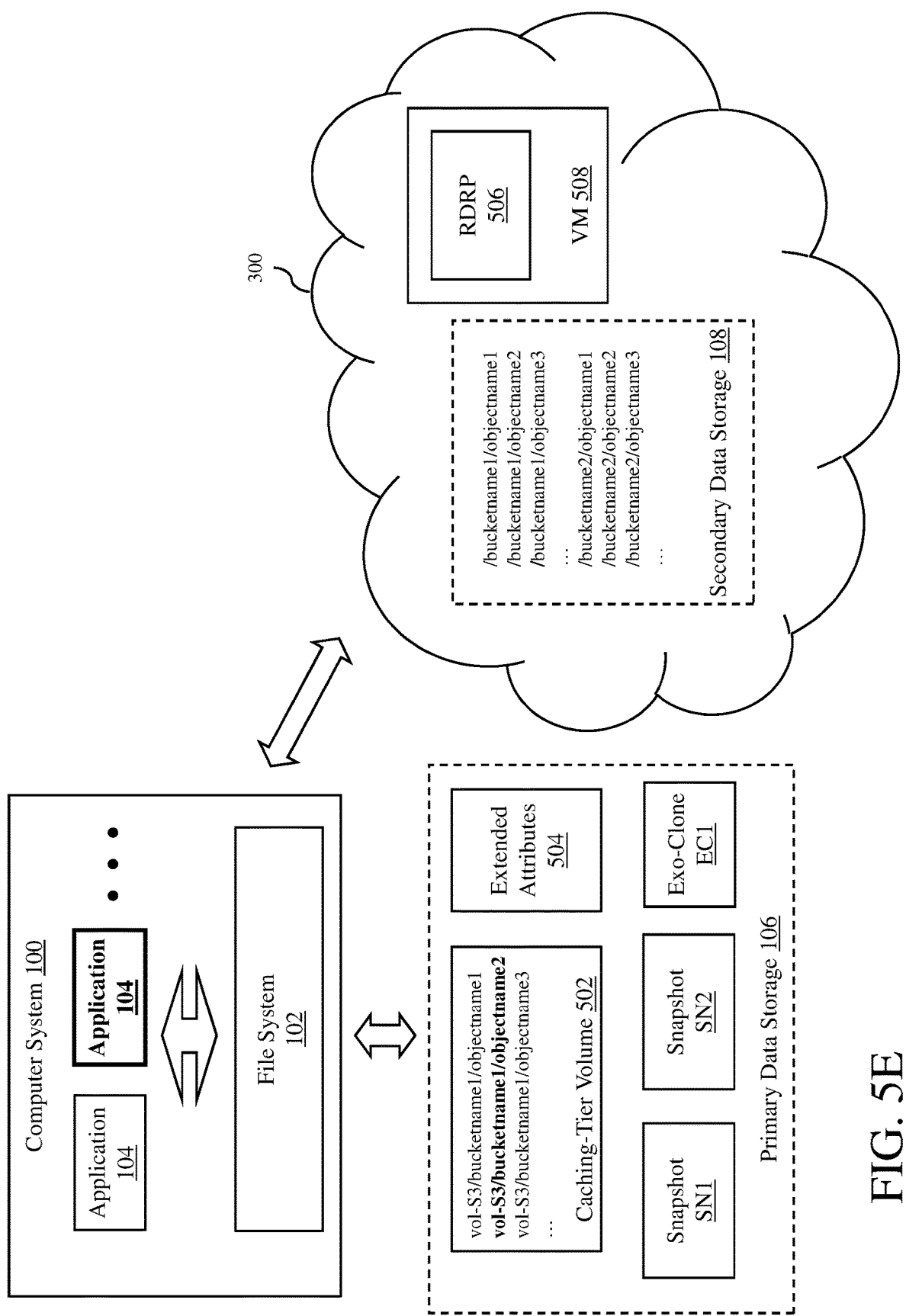

Next, at block 412, the file system 102 generates snapshot difference data between the two snapshots of the caching-tier volume. In an embodiment, the snapshot difference data that is generated is an exo-clone. This step is illustrated in FIG. 5E, where the file system creates an exo-clone EC1, which includes information on the differences between the snapshots SN1 and SN2 of the caching-tier volume 502 in the primary data storage.

Figure 5F:
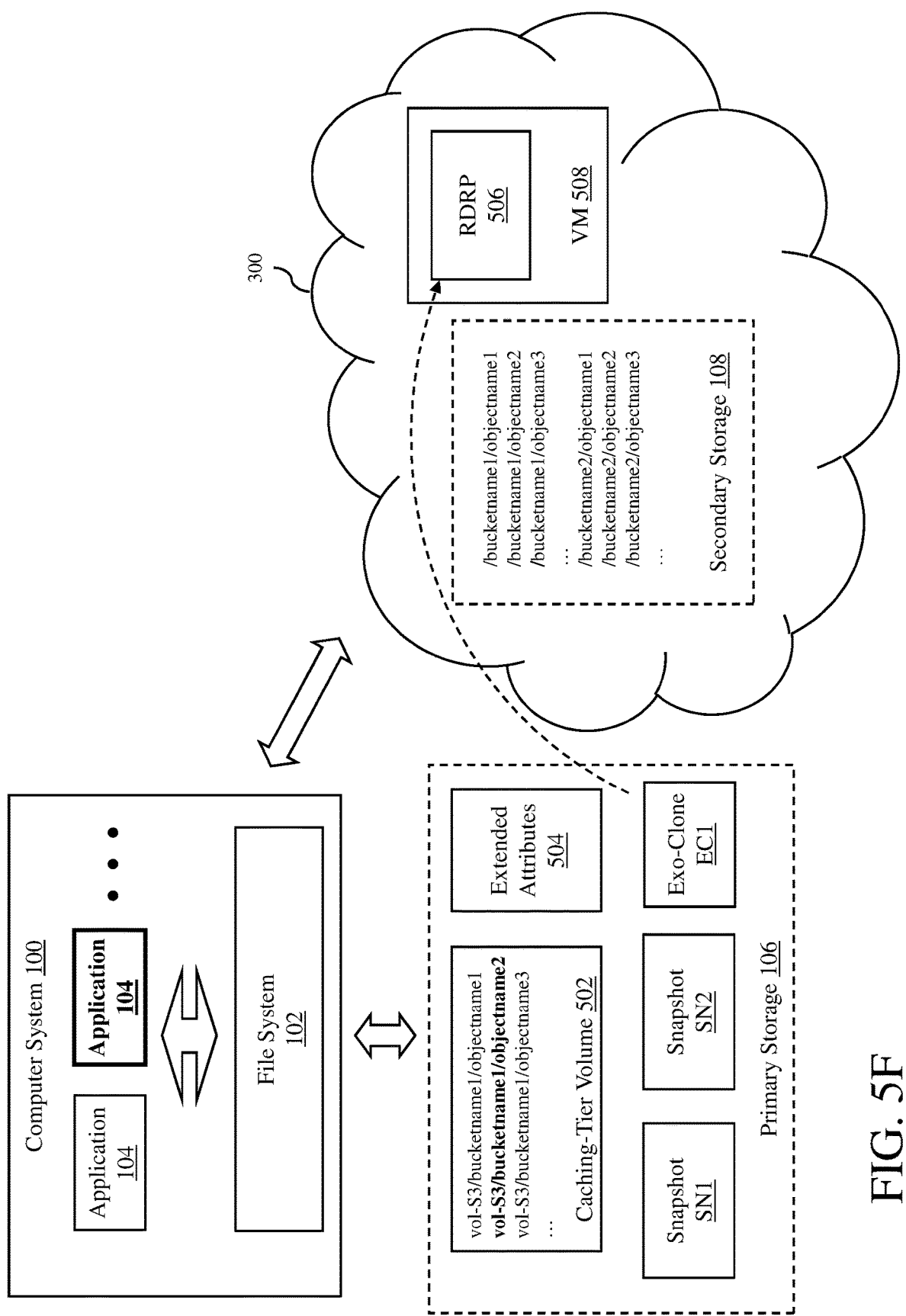

Next, at block 414, the file system 102 uploads the snapshot difference data to a remote data repository program for write-back. This step is illustrated in FIG. 5F, where the file system uploads the exo-clone EC1 to the remote data repository program 506, which is running on the virtual machine 508 in the same public cloud 300 as the secondary data storage 108.

Figure 5G:
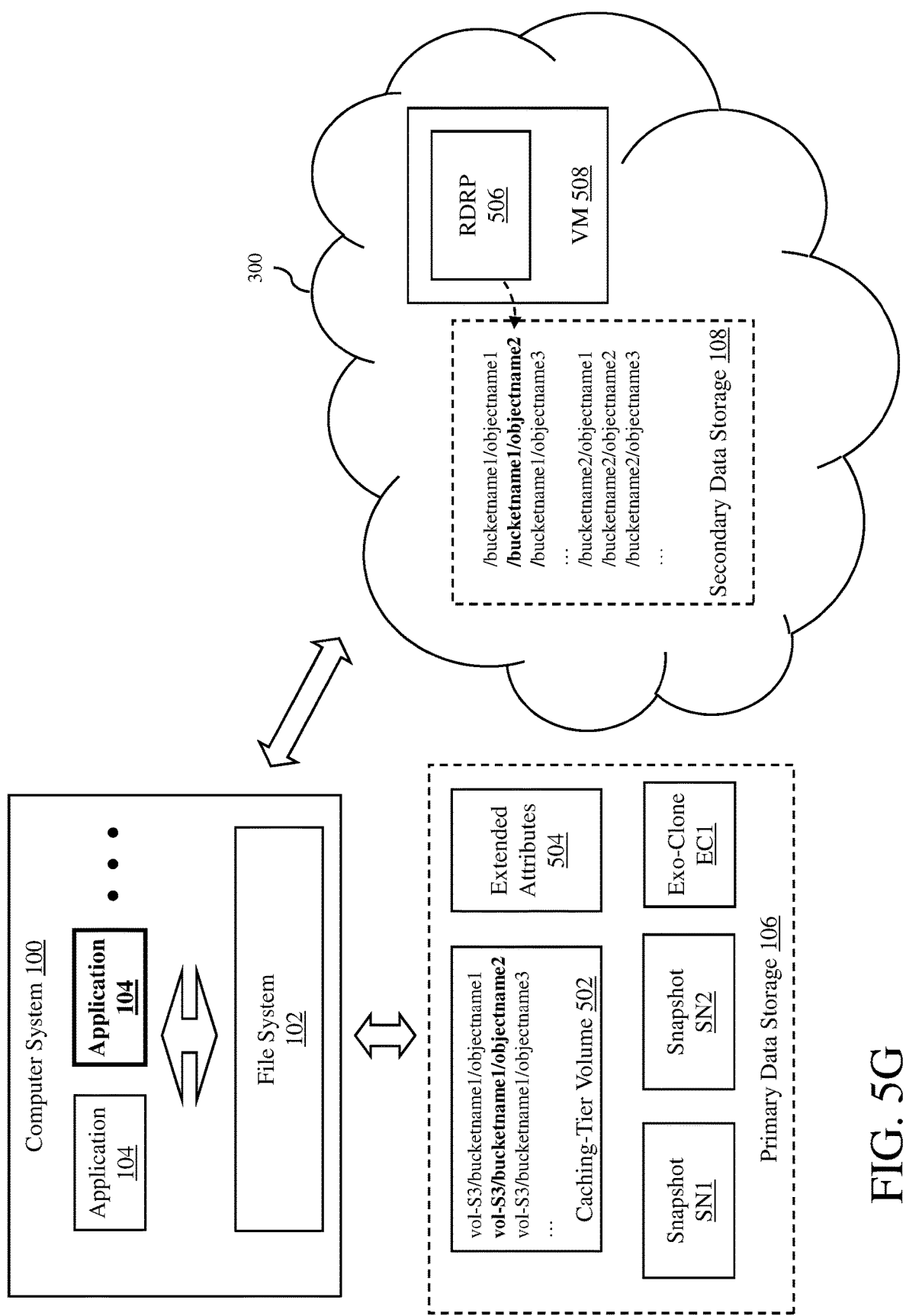

Next, at block 416, the remote data repository program uses the snapshot difference data to write-back any changes to the objects of the logical object container in the secondary data storage 108 corresponding to the caching-tier volume in the primary data storage. This step is illustrated in FIG. 5G, where the remote data repository program 506 running on the virtual machine 508 updates the object with the file path /bucketname1/objectname2 of the logical object container corresponding to the caching-tier volume 502 using the exo-clone EC1.

Figure 6:
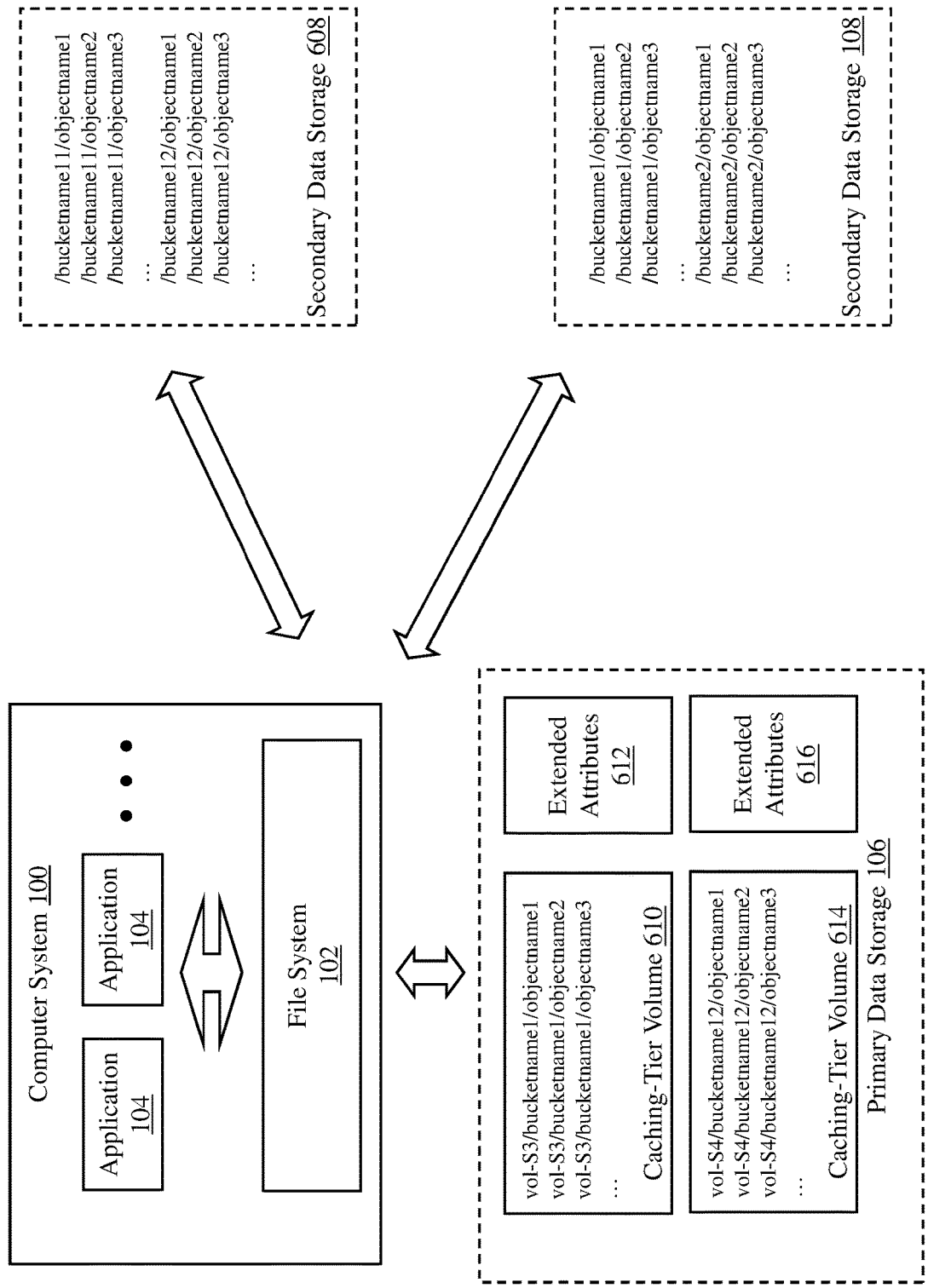
FIG. 6 illustrates multiple secondary data storages being managed by the file system of the computer system in accordance with an embodiment of the invention.

Although the access and write-back operations using the file system 102 have been described where the computer system 100 has access to one secondary data storage, these operations can be applied to cases where the computer system has access to more than one secondary data storage. In these situations, the file system may create multiple caching-tier volumes in the primary data storage 106 that correspond to logical object containers from different secondary data storages. As an example, FIG. 6 shows a situation where the computer system 100 has access to two secondary data storages, the secondary data storage 108 and another secondary data storage 608. In FIG. 6, the primary data storage includes two caching-tier volumes with associated extended attributes. Specifically, the primary data storage includes a caching-tier volume 610 with extended attributes 612 of files in that caching-tier volume that corresponds to a logical object container bucketname1 in the secondary data storage 108. In addition, the primary data storage includes a caching-tier volume 614 with extended attributes 616 of files in that caching-tier volume that corresponds to a logical object container bucketname12 in the other secondary data storage 608. Thus, the file system can support multiple secondary data storages.

Figure 7:
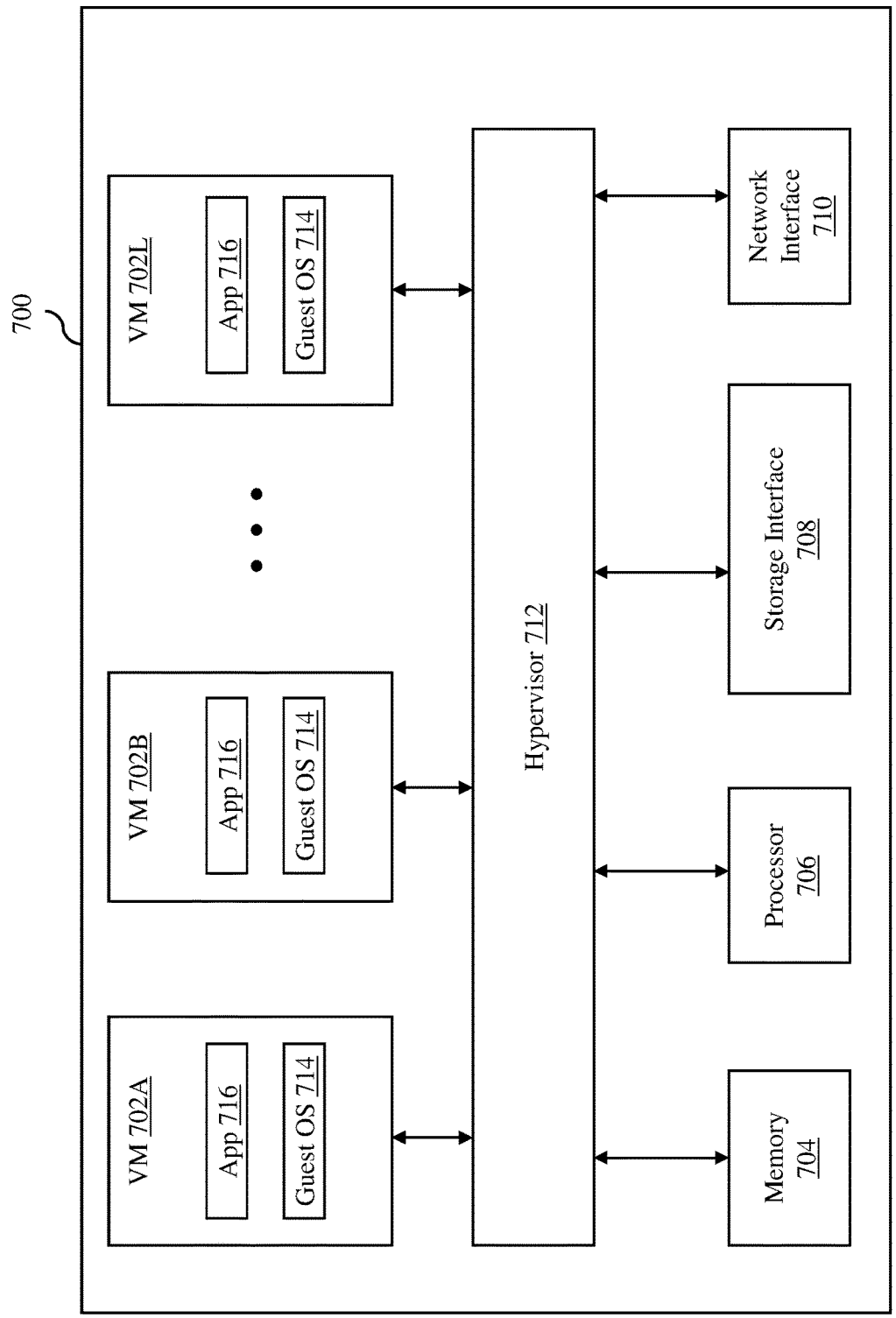
FIG. 7 is a block diagram of a physical computer system with a number of virtual machines in which the file system in accordance with an embodiment of the invention may be implemented.

The file system 102 is typically part of an operating system (OS) of a computer system, which may be a physical computer system, such as a physical server, or a virtual computer system, such as a virtual machine. Turning now to FIG. 7, a physical computer system 700 in which the file system may be implemented is shown. In FIG. 7, the physical connections between the various components of the computer system are not illustrated. As shown in FIG. 7, the physical computer system is configured to support a number of virtual machines (VMs) 702A, 702B . . . 702L (where L is a positive integer). The number of VMs supported by the physical computer system can be anywhere from one to more than one hundred. The exact number of VMs supported by the physical computer system is only limited by the physical resources of the physical computer system. The VMs share at least some of the hardware resources of the physical computer system, which include one or more system memories 704, one or more processors 706, a storage interface 708, and a network interface 710. Each system memory, which may be random access memory (RAM), is the volatile memory of the physical computer system. Each processor can be any type of a processor, such as a central processing unit (CPU) commonly found in a personal computer. The storage interface is an interface that allows that physical computer system to communicate with one or more physical storage systems, such as the primary data storage 106. As an example, the storage interface may be a host bus adapter or a network file system interface. The network interface is an interface that allows the physical computer system to communicate with other devices through one or more computer networks. As an example, the network interface may be a network adapter.

In the illustrated embodiment, the VMs 702A, 702B ... 702L run on "top" of a hypervisor 712, which is a software interface layer that, using virtualization technology, enables sharing of the hardware resources of the physical computer system 700 by the VMs. However, in other embodiments, one or more of the VMs can be nested, i.e., a VM running in another VM. Any computer virtualization architecture can be implemented. For example, the hypervisor may run on top of the physical computer system's operating system or directly on hardware of the physical computer system. With the support of the hypervisor, the VMs provide isolated execution spaces for guest software. Each VM may include a guest operating system 714, one or more guest applications 716. The guest operating system manages virtual system resources made available to the corresponding VM by the hypervisor, and, among other things, the guest operating system forms a software platform on top of which the guest applications run.

The file system 102 may be implemented in one or more VMs 702A, 702B ... 702L running in the physical computer system 700 as part of their OS, i.e., the guest OS 714. Thus, in this implementation, the file system allows guest applications 716 to access storage systems available to the physical computer system. The file system may also be implemented in the physical computer system as part of the host OS. Thus, the file system may be implemented in the OS of any physical or virtual computer system.

Figure 8:
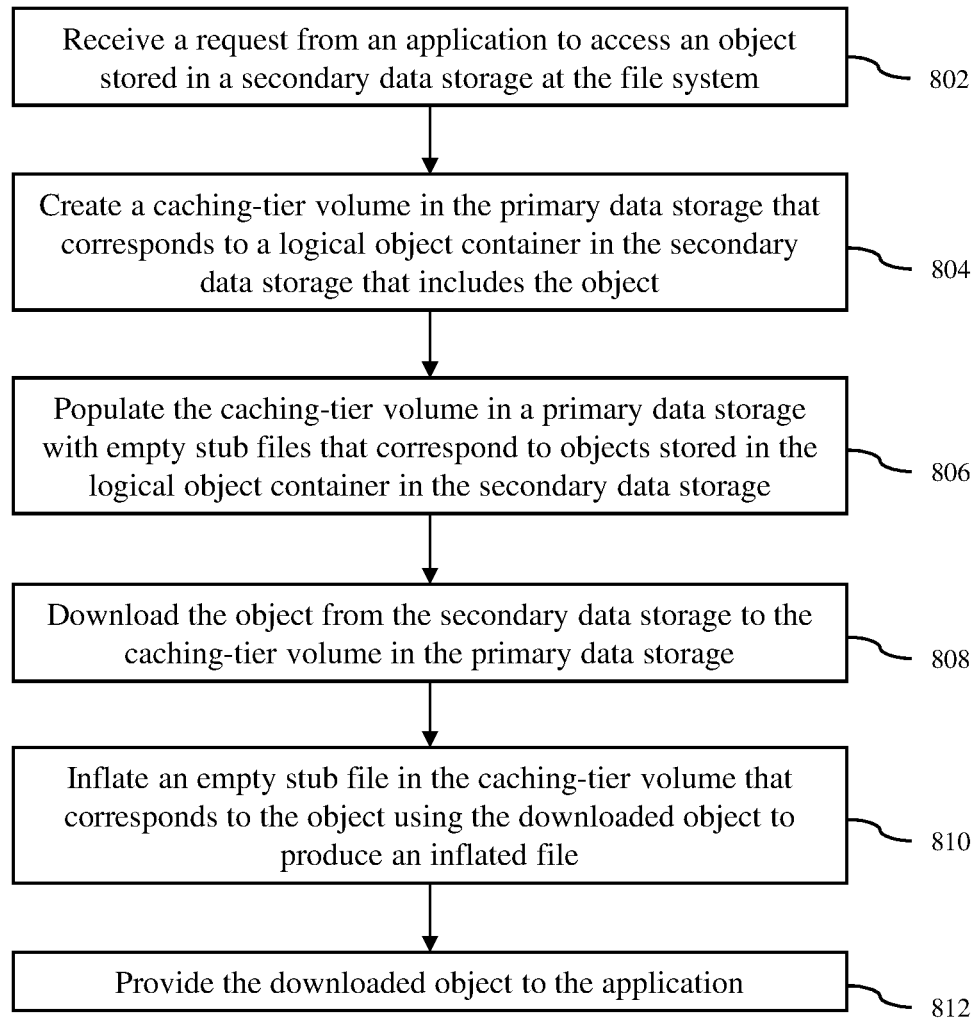
FIG. 8 is a flow diagram of a method for managing multiple data storages using a file system of a computer system in accordance with an embodiment of the invention.

A method for managing multiple data storages using a file system of a computer system in accordance with an embodiment of the invention is described with reference to a flow diagram of FIG. 8. At block 802, a request from an application to access an object stored in a secondary data storage of the computer system is received at the file system. The object in the secondary data storage is not currently cached at a primary data storage of the computer system. At block 804, a caching-tier volume in the primary data storage is created that corresponds to a logical object container in the secondary data storage that includes the object. At block 806, the caching-tier volume in the primary data storage is populated with empty stub files that correspond to objects stored in the logical object container in the secondary data storage. At block 808, the object is downloaded from the secondary data storage to the caching-tier volume in the primary data storage. At block 810, an empty stub file in the caching-tier volume that corresponds to the object is inflated using the downloaded object to produce an inflated file. At block 812, the downloaded object is provided to the application. The inflated file is available at the primary data storage in the caching-tier volume for a subsequent access request for the object stored in the secondary data storage.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing multiple data storages using a file system of a computer system, the method comprising:
   receiving a request from an application to access an object stored in a secondary data storage of the computer system at the file system, wherein the object is not currently cached at a primary data storage of the computer system;
   in response to the request, creating a caching-tier volume in the primary data storage that corresponds to a logical object container in the secondary data storage that includes the object;
   populating the caching-tier volume in the primary data storage with empty stub files that correspond to all objects stored in the logical object container in the secondary data storage;
   creating cache-related properties of the files in the caching-tier volume that are exposed to applications through an interface, wherein the cache-related properties are included in extended attributes of the files in the caching-tier volume and wherein at least one of the extended attributes of the files in the caching-tier volumes includes a skip write-back extended attribute that indicates that a particular file should be skipped during a write-back operation when changes made to the files of the caching-tier volume in the primary data storage are written back to the secondary data storage;
   downloading the object from the secondary data storage to the caching-tier volume in the primary data storage;
   inflating an empty stub file in the caching-tier volume that corresponds to the object using the downloaded object to produce an inflated file; and
   providing the downloaded object to the application,
   wherein the inflated file is available at the primary data storage in the caching-tier volume for a subsequent access request for the object stored in the secondary data storage.

2. The method of claim 1, wherein at least one of the extended attributes of the files in the caching-tier volumes includes a cached state extended attribute that indicates a current cache state of a particular file in the caching-tier volume, the current cache state indicating whether the particular file is an inflated file or a stub file.

3. The method of claim 1, wherein at least one of the extended attributes of the files in the caching-tier volumes includes a cache pinned extended attribute that indicates that a particular file should not be evicted from the caching-tier volume in the primary data storage.

4. The method of claim 1, further comprising:
   creating a first snapshot of the caching-tier volume;
   creating a second snapshot of the caching-tier volume after the first snapshot has been created;
   constructing snapshot difference data between the first and second snapshots; and
   transmitting the snapshot difference data to a remote data repository program running on another computer system to write-back any changes made to the caching-tier volume in the primary data storage to the secondary data storage.

5. The method of claim 1, further comprising creating another caching-tier volume in the primary data storage that corresponds to another logical object container in another secondary data storage that includes the object in response to an access request for another object stored in the another secondary data storage so that the primary data storage includes the caching-tier volume corresponding to a logical object container in the secondary data storage and another caching-tier volume corresponding to another logical object container in the another secondary data storage.

6. The method of claim 1, wherein the file system is a Portable Operating System Interface (POSIX) compliant file system.

7. The method of claim 1, wherein the secondary data storage is a public cloud object storage or a remote data center, the remote data center being a private or public data center.

8. A non-transitory computer-readable storage medium containing program instructions for managing multiple data storages using a file system of a computer system, wherein execution of the program instructions by one or more processors of a computer system causes the one or more processors to perform steps comprising:
   receiving a request from an application to access an object stored in a secondary data storage of the computer system at the file system, wherein the object is not currently cached at a primary data storage of the computer system;
   in response to the request, creating a caching-tier volume in the primary data storage that corresponds to a logical object container in the secondary data storage that includes the object;
   populating the caching-tier volume in the primary data storage with empty stub files that correspond to all objects stored in the logical object container in the secondary data storage;
   creating cache-related properties of the files in the caching-tier volume that are exposed to applications through an interface, wherein the cache-related properties are included in extended attributes of the files in the caching-tier volume and wherein at least one of the extended attributes of the files in the caching-tier volumes includes a skip write-back extended attribute that indicates that a particular file should be skipped during a write-back operation when changes made to the files of the caching-tier volume in the primary data storage are written back to the secondary data storage;
   downloading the object from the secondary data storage to the caching-tier volume in the primary data storage;
   inflating an empty stub file in the caching-tier volume that corresponds to the object using the downloaded object to produce an inflated file; and
   providing the downloaded object to the application,
   wherein the inflated file is available at the primary data storage in the caching-tier volume for a subsequent access request for the object stored in the secondary data storage.

9. The computer-readable storage medium of claim 8, wherein at least one of the extended attributes of the files in the caching-tier volumes indicate a current cache state of a particular file in the caching-tier volume, the current cache state indicating whether the particular file is an inflated file or a stub file.

10. The computer-readable storage medium of claim 8, wherein the steps further comprise:
   creating a first snapshot of the caching-tier volume;
   creating a second snapshot of the caching-tier volume after the first snapshot has been created;
   constructing snapshot difference data between the first and second snapshots; and
   transmitting the snapshot difference data to a remote data repository program running on another computer system to write-back any changes made to the caching-tier volume in the primary data storage to the secondary data storage.

11. The computer-readable storage medium of claim 8, wherein the steps further comprise creating another caching-tier volume in the primary data storage that corresponds to another logical object container in another secondary data storage that includes the object in response to an access request for another object stored in the another secondary data storage so that the primary data storage includes the caching-tier volume corresponding to a logical object container in the secondary data storage and another caching-tier volume corresponding to another logical object container in the another secondary data storage.

12. A system comprising:
   memory; and
   a processor configured to:
      receive a request from an application to access an object stored in a secondary data storage of the system at a file system, wherein the object is not currently cached at a primary data storage of the system;
      in response to the request, create a caching-tier volume in the primary data storage that corresponds to a logical object container in the secondary data storage that includes the object;
      populate the caching-tier volume in the primary data storage with empty stub files that correspond to all objects stored in the logical object container in the secondary data storage;
      create cache-related properties of the files in the caching-tier volume that are exposed to applications through an interface, wherein the cache-related properties are included in extended attributes of the files in the caching-tier volume and wherein at least one of the extended attributes of the files in the caching-tier volumes includes a skip write-back extended attribute that indicates that a particular file should be skipped during a write-back operation when changes made to the files of the caching-tier volume in the primary data storage are written back to the secondary data storage;
      download the object from the secondary data storage to the caching-tier volume in the primary data storage;
      inflate an empty stub file in the caching-tier volume that corresponds to the object using the downloaded object to produce an inflated file; and
   provide the downloaded object to the application,
   wherein the inflated file is available at the primary data storage in the caching-tier volume for a subsequent access request for the object stored in the secondary data storage.

13. The system of claim 12, wherein the processor is further configured to:
   create a first snapshot of the caching-tier volume;
   create a second snapshot of the caching-tier volume after the first snapshot has been created;
   construct snapshot difference data between the first and second snapshots; and
   transmit the snapshot difference data to a remote data repository program running on another computer system to write-back any changes made to the caching-tier volume in the primary data storage to the secondary data storage.

14. The system of claim 12, wherein the processor is configured to create another caching-tier volume in the primary data storage that corresponds to another logical object container in another secondary data storage that includes the object in response to an access request for another object stored in the another secondary data storage so that the primary data storage includes the caching-tier volume corresponding to a logical object container in the secondary data storage and another caching-tier volume corresponding to another logical object container in the another secondary data storage.

* * * * *